(12) United States Patent
Vandrak et al.

(10) Patent No.: US 7,431,748 B2
(45) Date of Patent: Oct. 7, 2008

(54) SEPARATION DEVICE

(75) Inventors: Brian S. Vandrak, Highland Heights, OH (US); Carl W. Suchovsky, Aurora, OH (US)

(73) Assignee: Enerco Group, Inc., Cleveland, OH (US)

( * ) Notice: Subject to any disclaimer, the term of this patent is extended or adjusted under 35 U.S.C. 154(b) by 484 days.

(21) Appl. No.: 10/907,784

(22) Filed: Apr. 15, 2005

(65) Prior Publication Data

US 2005/0150828 A1 Jul. 14, 2005

(51) Int. Cl.
*B01D 45/08* (2006.01)

(52) U.S. Cl. .............................. 55/463; 55/464; 55/465; 55/418; 95/272; 95/267

(58) Field of Classification Search .................... 55/462, 55/463, 464, 465, 419, 418; 95/272, 267
See application file for complete search history.

(56) References Cited

U.S. PATENT DOCUMENTS

| | | | | |
|---|---|---|---|---|
| 103,731 A | * | 5/1870 | Freeman et al. ............... | 55/455 |
| 422,202 A | * | 2/1890 | Furney ......................... | 96/247 |
| 2,205,336 A | * | 6/1940 | Beach .......................... | 210/519 |
| 3,997,303 A | * | 12/1976 | Newton ........................ | 95/284 |
| 4,171,947 A | | 10/1979 | Rice ............................ | 431/328 |
| 4,640,680 A | | 2/1987 | Schilling ..................... | 431/350 |
| 4,762,488 A | | 8/1988 | Schilling ..................... | 431/350 |
| 4,944,324 A | | 7/1990 | Kajino et al. ................ | 137/113 |
| 5,485,829 A | | 1/1996 | Santhouse et al. ........... | 126/409 |
| 5,573,393 A | | 11/1996 | Tsai ............................ | 431/255 |
| 5,902,101 A | | 5/1999 | Palmer et al. ................ | 431/202 |
| 5,916,319 A | | 6/1999 | Tsai ............................ | 431/344 |
| 5,961,319 A | * | 10/1999 | Tsai ............................ | 431/344 |
| 6,142,770 A | | 11/2000 | Salto ........................... | 431/344 |
| 6,422,232 B1 | | 7/2002 | Ashton et al. ............... | 126/92 B |
| 6,499,480 B2 | | 12/2002 | Ashton et al. .............. | 126/92 B |
| 6,505,620 B1 | | 1/2003 | Goto ............................ | 126/38 |

* cited by examiner

*Primary Examiner*—Duane Smith
*Assistant Examiner*—Douglas J Theisen
(74) *Attorney, Agent, or Firm*—Brouse McDowell; John M. Skeriotis, Esq.

(57) ABSTRACT

A separation device for the removal of impurities extracted from a flexible conduit from a fuel such as liquefied petroleum gas is described having a housing with an inlet and an outlet, a means for channeling the fuel from the inlet onto an impingement surface in fluid communication with the fuel stream, the surface acting to condense the impurities, a gravity separation means for collecting the impurities removed from the fuel, and a means for channeling the fuel into an outlet.

25 Claims, 6 Drawing Sheets

SEPARATION DEVICE

TECHNICAL FIELD

This invention relates generally to a mechanical separation device which is useful in apparatii which employ lengths of plasticized rubber hoses for the transport of liquefied petroleum (LP) gas as a fuel source stored in a remote container to a fuel nozzle for use in a combustion application. The separation device entraps extracted plasticizers and low molecular weight hydrocarbons which are soluble in the LP gas, and prevent their egress into the nozzle, with concomitant elimination of nozzle and fuel line clogging due to solids build-up as the extractants condense and often-times, solidify from their solubilized state.

BACKGROUND OF THE INVENTION

LP gas or LPG is an abbreviation for liquefied petroleum gas. Like all fossil fuels, it is a non-renewable source of energy. It is extracted from crude oil and natural gas. The main composition of LPG is hydrocarbons containing three or four carbon atoms. The typical components of LPG are propane ($C_3H_8$) and butane ($C_4H_{10}$). Small concentrations of other hydrocarbons may also be present. Depending on the source of the LPG and how it has been produced, components other than hydrocarbons may also be present.

LPG is a gas at atmospheric pressure and normal ambient temperatures, but it can be liquefied when moderate pressure is applied or when the temperature is sufficiently reduced. It can be easily condensed, packaged, stored and utilized, which makes it an ideal energy source for a wide range of applications. Normally, the gas is stored in liquid form under pressure in a steel container, cylinder or tank. The pressure inside the container will depend on the type of LPG (Commercial butane or commercial propane) and the outside temperature.

In the LPG industry, a common means of transferring the liquid product from its storage container to a combustion device for example, other than metallic pipe, involves the use of high- and low-pressure flexible hoses. These hoses are fabricated to meet applicable regulations, including a design pressure of 350 psi, a safety factor of 5 to 1, and "be fabricated of materials that are resistant to the action of LP gas both as liquid and vapor." See National Fire Protection Association ("NFPA") 58 2-4.6.1

However, the term "resistant" is not defined in NFPA, but does not necessarily mean impervious. Extractable contaminants which have been detected in gas exiting through these hoses includes, but are not limited to, phenyl beta-naphthylamine, phthalates (e.g., dibutylphthalate, diisooctylphthalate, dioctyl/nonyl phthalate isomer, di-nonylphthalate isomer), adipates (e.g., dioctyladipate), sebacates (e.g., dibutyl sebacates), lower molecular weight alkanes (e.g., $C_{12}$-$C_{20}$ alkanes) and sulfur. Phenyl beta naphthylamine is a well-known antioxidant used in compounding rubber, phthalates are common plasticizers, and elemental sulfur is a rubber-vulcanizing agent. When these contaminants exceed their solubility limits, as occurs particularly at the atomizer of combustion devices, such as portable heaters, or are deposited within the small diameter tubing leading to the atomizer, the resultant oily residue leads to clogging in both the tubing and the nozzle tip.

It has even been determined that the varying compositions of LP gas can influence the amount of plasticizer extracted from the hoses. Butane has been found to extract less plasticizer than propane, and propane extracted less than propylene. The extraction of all constituents increases with temperature. Fuel quality standard HD-5 limits the amount of propylene to 5% and butane to 2.5% by volume. However, commercial grade product is defined as "predominantly propane and/or propylene" with a 2.5% limit on butane. The different grades of product are not normally separated in the broad distribution system in North America.

It is an aspect of the present invention to provide a separation device which effectively removes extractable constituents from LPG hoses prior to the LPG nozzle tip before entry into the combustion chamber. In one embodiment of this invention, this removal is effected by the incorporation of a downwardly and upwardly fingered impingement region or surface which selectively promotes gas flow through the device yet traps undesirable lower molecular weight hydrocarbons and oligomers which form viscous oils which often solidify after condensing from the gas, thereby preventing clogging of small diameter passageways which lead up to nozzle adjacent the combustion chambers of heating devices in particular.

It is another aspect of this invention to provide an inexpensive separation device which effectively removes extractable constituents from LPG hoses for at least one entire heating season.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The invention is described with reference to the accompanying figures, which illustrate the best mode known to the inventor at the time of the filing of the application illustrating the separation device of the invention.

Figure 1:
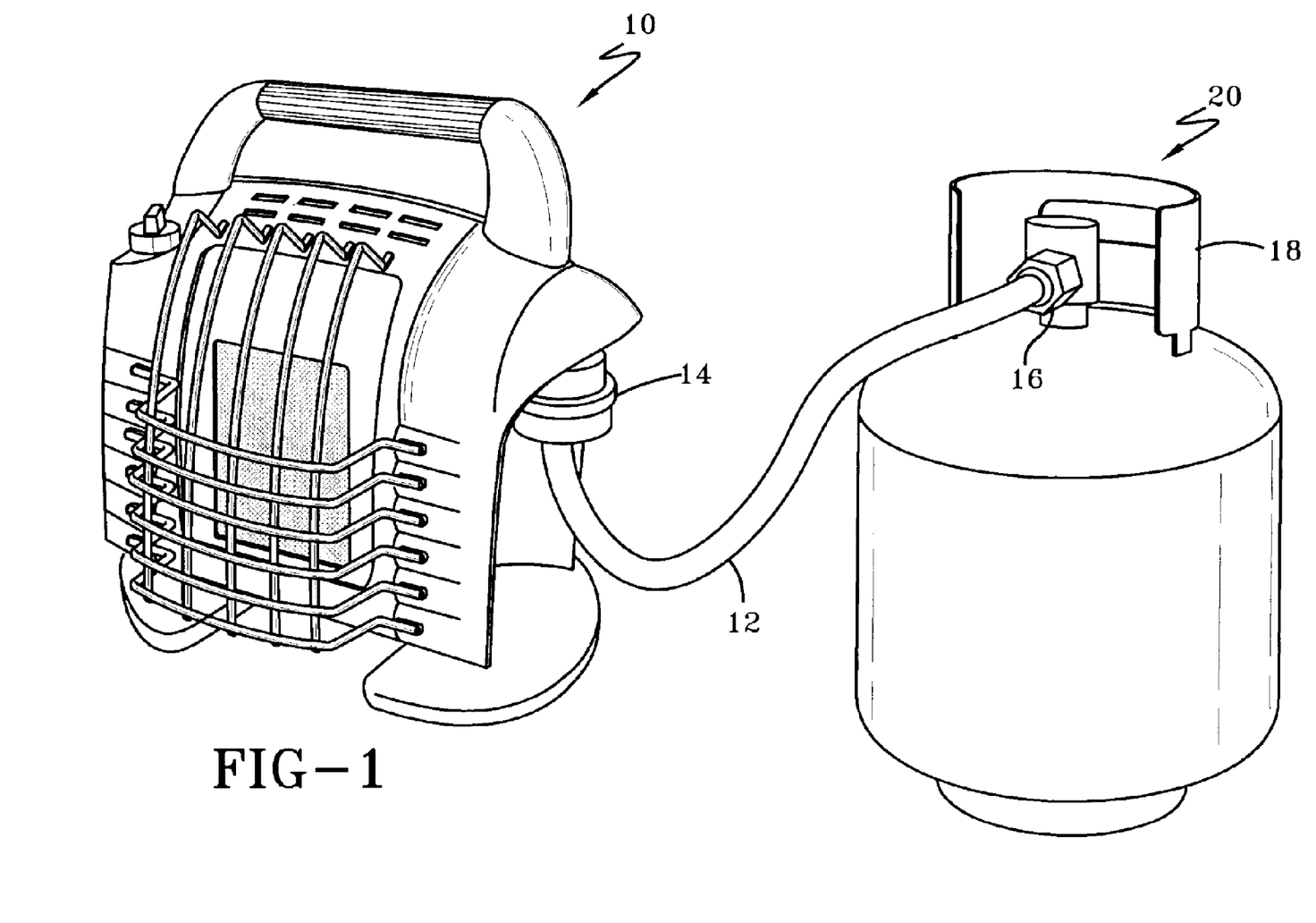
FIG. 1 is a perspective view of a separation device shown attached to a portable heating device using a larger sized LPG tank as the fuel source with an interconnecting flexible hose.
Figure 4:
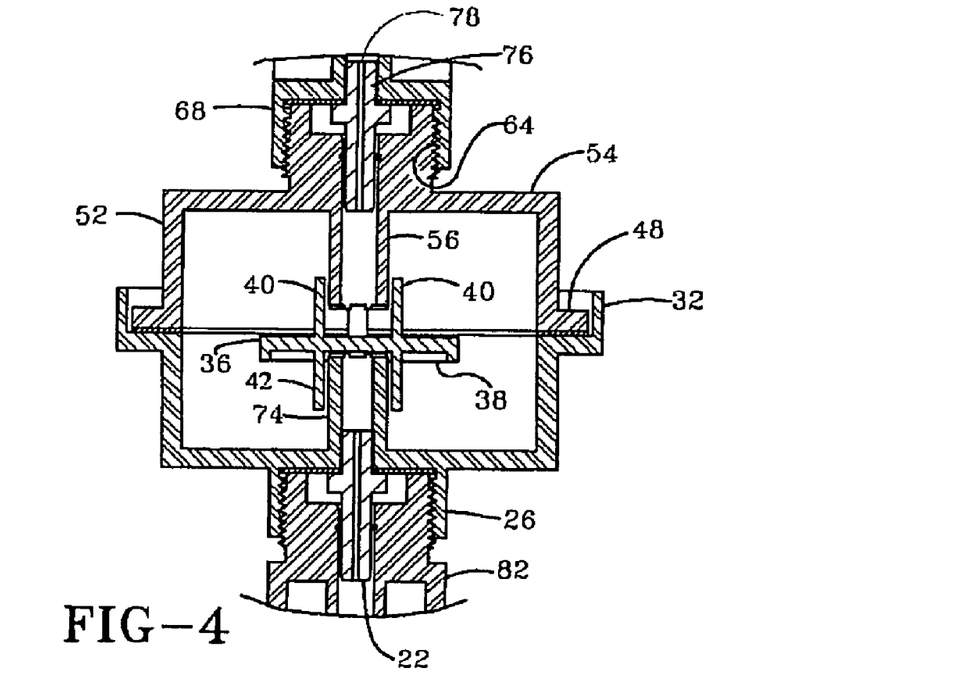
FIG. 4 is side cross-sectional view of the separation device with impingement means in lower position.
Figure 5:
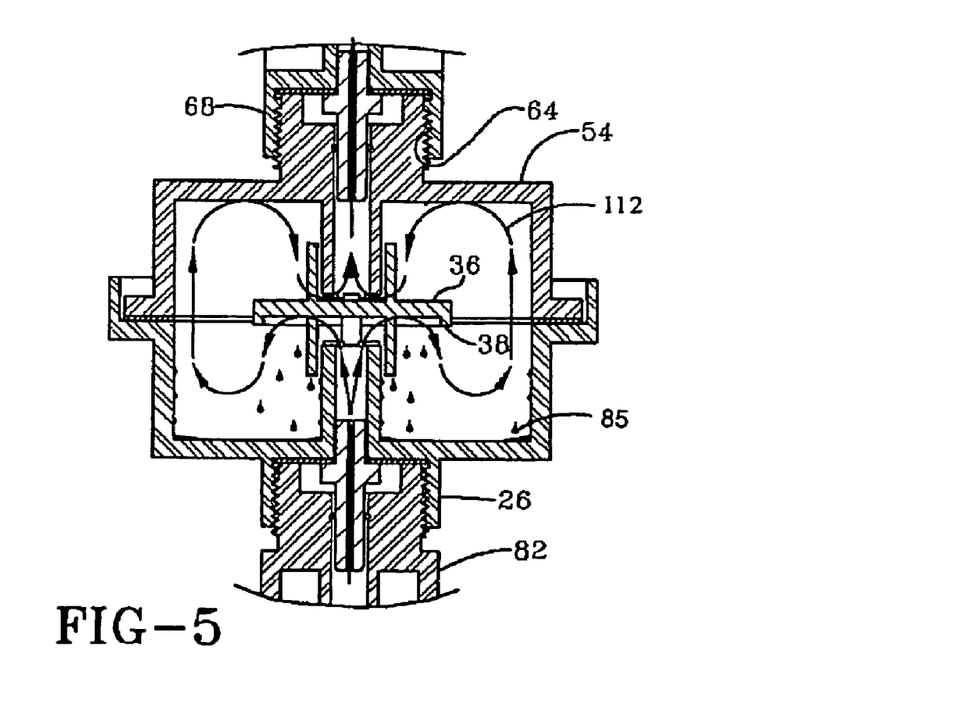
FIG. 5 is a side cross-sectional view of FIG. 4 with impingement means in the upper position.

As illustrated in FIG. 1, when larger capacity LPG fuel sources are required, as compared to the typical one pound propane cylinder which is often used with portable heating devices, as for example would be desirable with extended duration heating, LPG fuel source 20 with protective upwardly extending collar 18 is typically connected to the portable heating device 10 by a flexible LPG rubber hose 12 by a pair of fittings, one of which 16 is illustrated in leak-proof engagement with the valve stem of the LPG fuel source 20 while the opposing fitting 82, better illustrated in FIGS. 4-5, is shown engaged and affixed to one end of separation device 14 which is affixed into a gas regulator affixed within the housing of the heating device. Not shown, but as is well known in the art and positioned within heating device 10 are various components, which include a small diameter fuel line terminating with a fuel nozzle and combustion section, among others.

Figure 2:
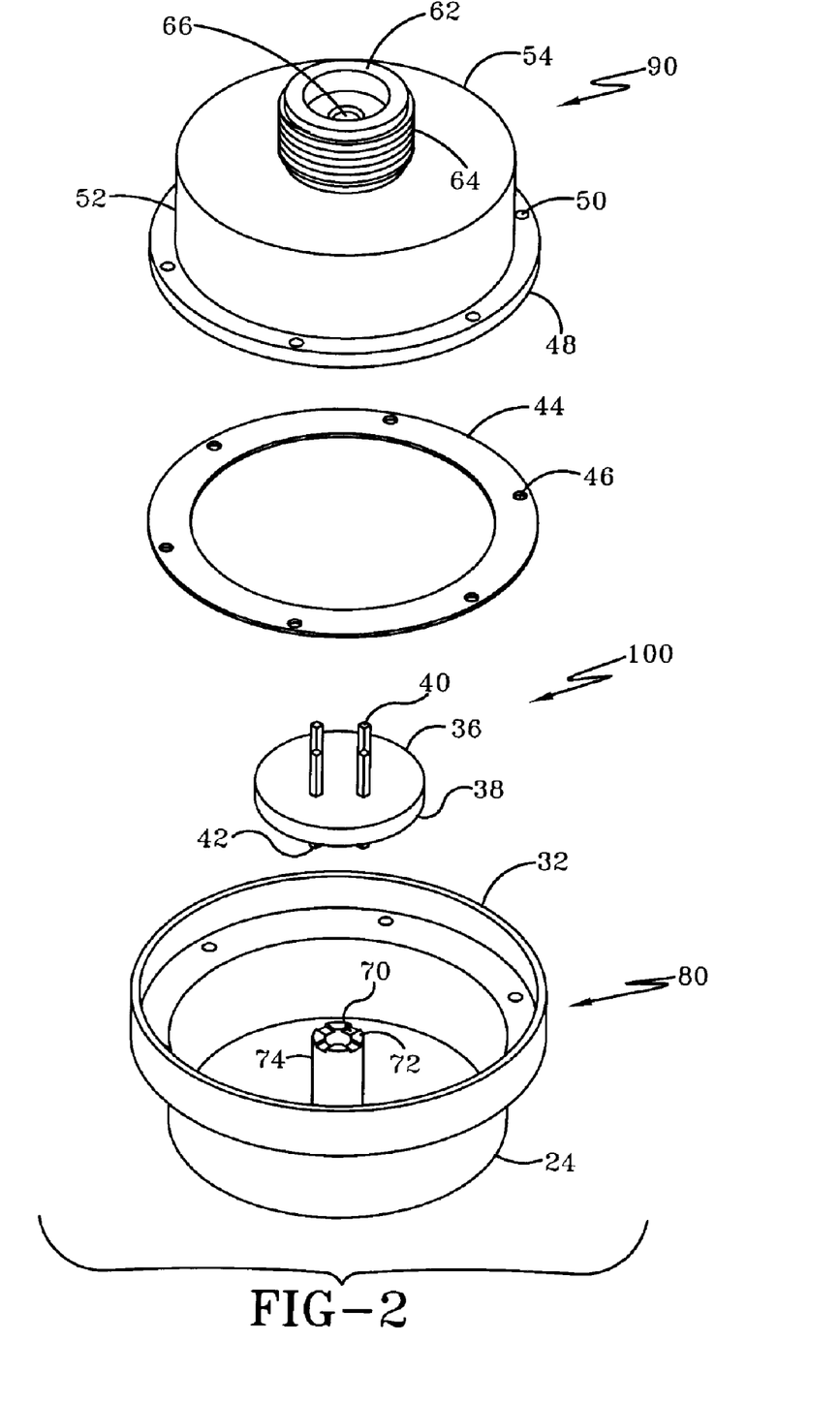
FIG. 2 is a top assembly view of the separation device.
Figure 3:
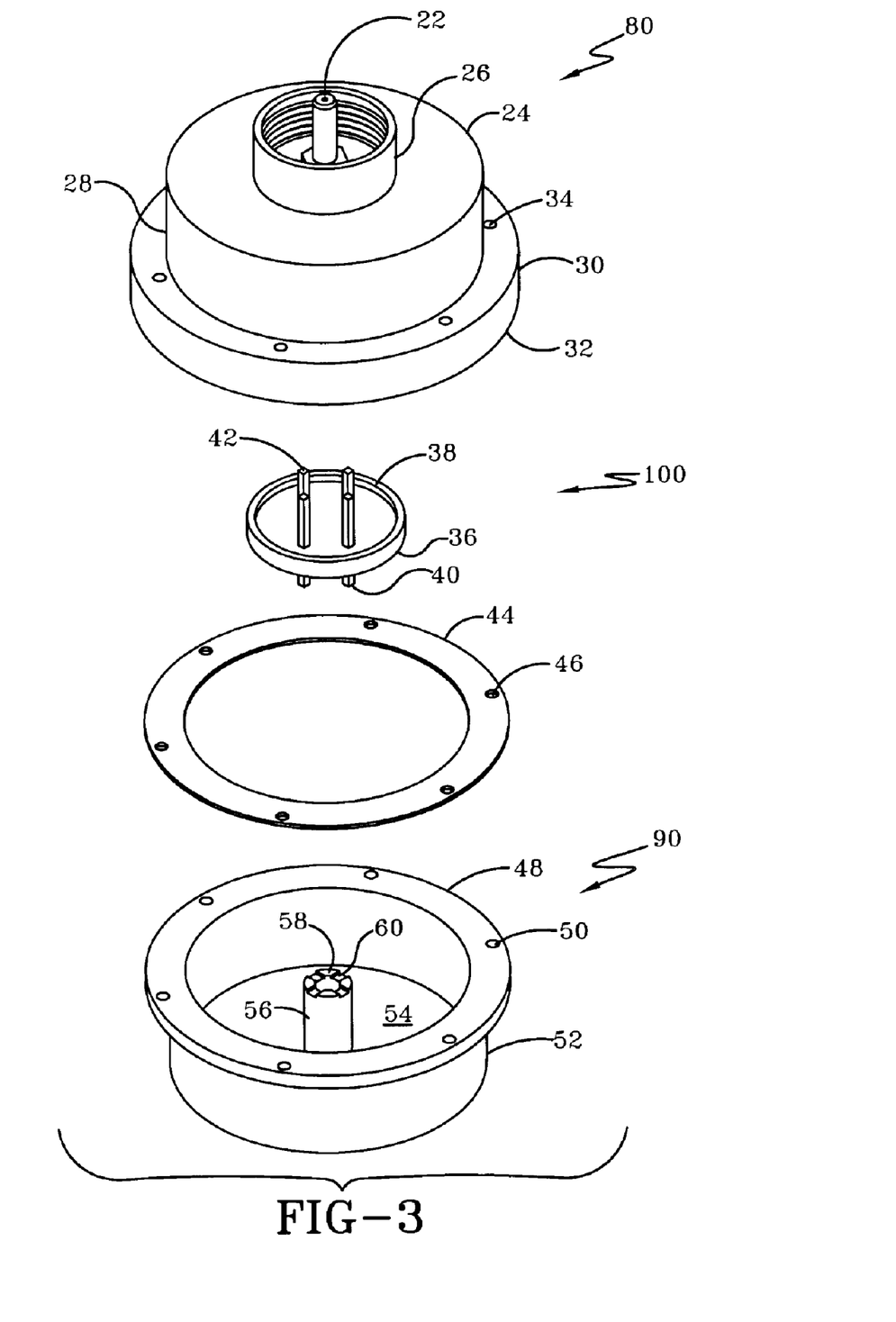
FIG. 3 is bottom assembly view of the separation device.

As better illustrated in FIG. 2, in one embodiment, separation device 14 is comprised of an essentially hollow cylindrical top half 90 and an essentially hollow cylindrical bottom half 80 with longitudinally axially movable impingement means 100 with corresponding impingement surface in fluid communication interposed there between, preferably concentrically and coaxially, each of said halves connected in a leak-proof manner by a plurality of connecting means (e.g., screws, rivets, welds, crimping) in physical securing engagement with gasket 44 or other sealing means, e.g., flexible O-ring. Top half 90 has generally cylindrical walls 52 and top 54 with an exteriorly threaded 64 male end 62 stem with a centrally disposed continuous bore 66 therein and a bottom flange 48 having a plurality of apertured (optionally threaded) openings 50 disposed therein for fastening top and bottom halves together in a leak-tight (liquid and/or gas and combinations thereof) manner. It is recognized that when crimping or welding methodologies are employed as the fastening technology, there is no need for apertures 50, 34 in either the top or bottom half as well as any apertures 46 in gasket 44. As better illustrated in FIG. 3, the interior of top half 90 is generally open and includes a downwardly (recognizing that FIG. 3 is viewed from the opposing perspective from FIG. 2) extending essentially vertical cylindrical projection 56 from top 54, said projection including at least one, preferably two or more, peak 58 and valley 60 segments. Each valley forms an ingress channel for essentially contaminant-free gaseous fluid communication with central contiguous bore for ultimate flow into a pressure regulator. While an essentially flat gasket is illustrated in the Figures, there is no need to limit the invention to such, and in fact, it is envisioned that large rubber O-rings are equally applicable in the invention, such O-rings generally positioned within an annulus (not shown) in either one or both halves of the separation device.

Lower half 80 of the separation device also has generally cylindrical walls 28 having a bottom 24 with an interiorly threaded collar 26 with centrally positioned valve stem 22 having a continuous concentric axial bore disposed therein and a bottom flange 30 with generally cylindrical sides 32 having a plurality of apertured (optionally threaded) openings 34 disposed therein for fastening top half 90 to bottom half 80. As better illustrated in FIG. 2, the interior of the bottom half is generally open and includes an upwardly extending vertical cylindrical projection 74 from bottom 24, said projection including at least one, preferably two or more, peak 72 and valley 70 segments. In a manner similar to that described above, each valley forms an egress channel for the contaminated gaseous feed stream to flow therefrom. However, in light of the vertical axial movement possible with impingement means 100 as discussed subsequently, the need for peak and valley segments is not essential with upwardly extending vertical cylindrical projection.

Leak-proof engagement of upper and lower halves of the separation device is effected by tightly engaging both halves by the mechanical application of force, e.g., crimping, riveting, clamping, welding, screwing, etc., with gasket 44 interposed there between. When using screws as the attachment means, the gasket will have apertures 46 disposed therein in physical alignment with and corresponding with openings 34 and 50 respectively in the lower and upper halves.

As illustrated in FIGS. 2-3, concentrically and co-axially positioned impingement means 100 having an impingement surface 36 are in fluid communication with egress 112 stream emanating from projection 74 containing the contaminated gaseous fuel for condensing any contaminants leached or extracted from the flexible supply hose 12 by the fuel. Upon impingement of the surface, whether by direct contact with the flow channel defined by upwardly extending vertical cylindrical projection 74 or indirect contact with the effluent of that same flow channel exiting from the egress pathways defined by valleys 70, the contaminants 85 being higher in molecular weight than the gaseous feed stream, will tend to condense and fall by gravity to the bottom 24 of lower half 80 of the separation device. In one embodiment, impingement means 100 will have at least two, preferably four legs extending both upwardly 40 and downwardly 42 from circular impingement surface 36. Each respective leg is positioned about a radius of the impingement device which permits sliding upward and downward movement of the impingement means about the exterior radius of upwardly extending projection 74 and downwardly extending projection 56. The bottom side of this surface preferably has a downwardly extending lip 38 to further enhance the capture of any condensed contaminants and their collection at the bottom of the separation device.

As better illustrated in FIGS. 4-5, the separation device is positioned into a regulator having an interiorly threaded female attachment means 68 matingly threaded 64 on the interior. Valve stem 76 with associated continuous coaxial vertical bore 78 extends through the female attachment means. At the opposed end, flexible rubber hose 14 is attached to the separation device by threading engagement of its male end 82 to interiorly threaded female attachment means 26 of the separation device. In operation, contaminated fuel enters the separation device (inlet stream) through the inlet of valve stem 22 and proceeds through coaxial egress channel defined in upwardly extending projection 74. As illustrated in FIG. 4, with little or minimal flow through the inlet, impingement means 100 is positioned in its initial gravity-defined downward position. Flow is still possible in this configuration in light of the valley egress pathways 70. However, more typically, upon the occurrence of more significant flow rates, impingement means 100 will move upward as illustrated in FIG. 5, thereby permitting the device to work, even without the existence of valley egress pathways 70. The device is held in position through the cooperation of radially interspersed upwardly 40 and downwardly 42 extending legs which are in radial proximity to the exterior circumference of projections 74 and 56. Upon impingement of the fuel feed stream upon bottom impingement surface 36, any solubilized impurities, or other impurities (liquid or solid) which are entrapped in the fuel, will tend to condense and migrate toward the downwardly-extending lateral peripheral lip 38 for gravity separation and collection at the bottom of the device as illustrated by liquid or solid non-LPG fuel components 85. The fuel, with contaminants 85 removed, continues to flow into the upper half of the separation device for ingress pathways, e.g., valleys 60 in the upper projection 56 or simply through ingress into the central channel defined within the upper projection for ultimate transport into channel 78 of the valve stem 76 of the regulator contained within the housing of the burner.

Figure 6:
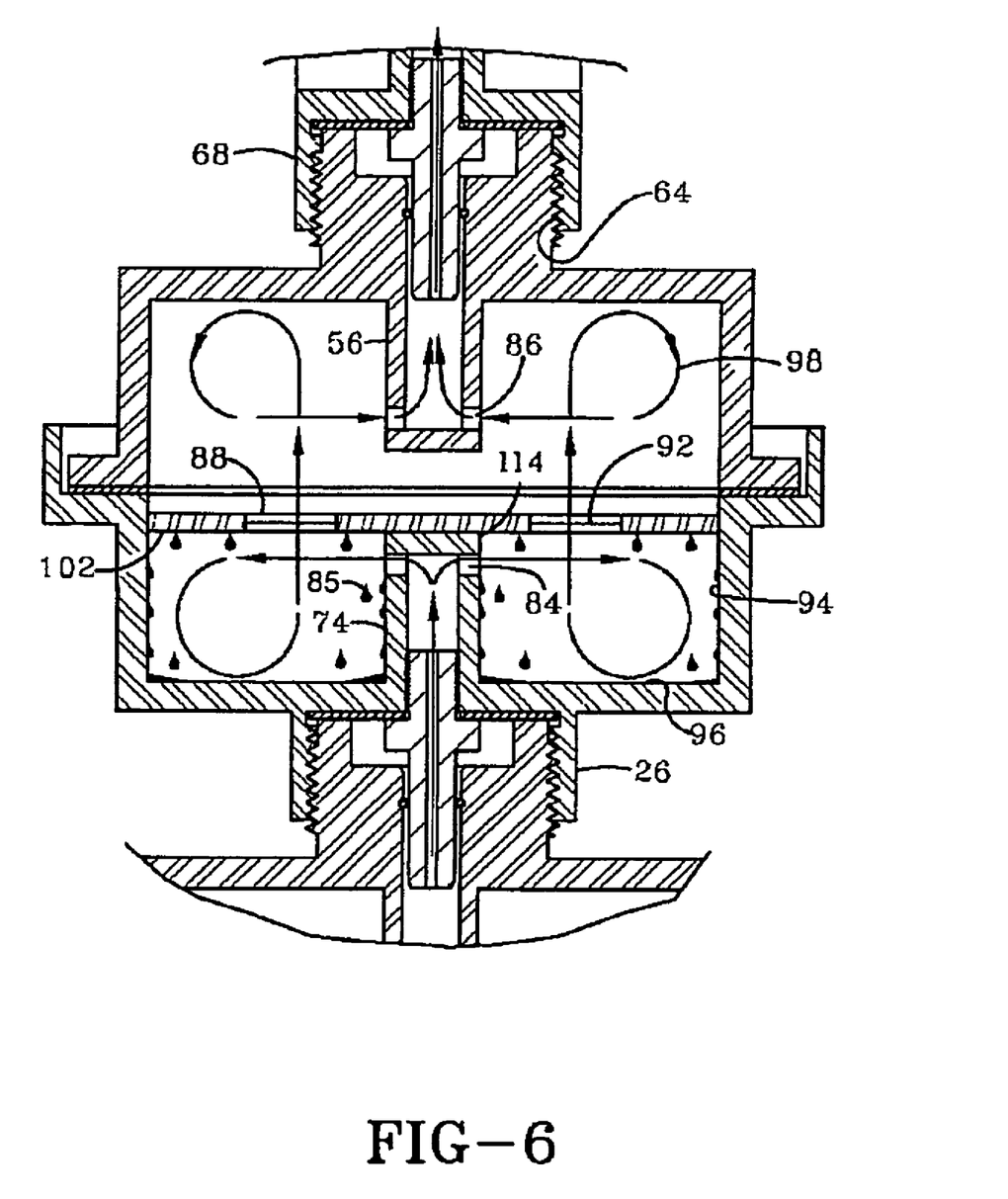
FIG. 6 is a side cross-sectional view of an alternative embodiment of the invention illustrating a side impingement surface.

In an alternative embodiment illustrated in FIG. 6, the separation device uses an alternative geometry in which the separate impingement means 100 has been eliminated. In this arrangement, upwardly-directed projection 74 is capped and at least one, preferably two to four lateral openings 84 are positioned therein to channel the fuel to an impingement surface, which in this instance, is either the inner side wall 94 of the lower half of the device or the floor 96 or combinations thereof, which act as the impingement and condensing surface. In this embodiment, designed for higher flow applications, a plurality of apertures 88 are positioned within partition 102, each aperture further optionally having screen or mesh 92 for acting as a supplemental methodology for retaining any condensed or precipitated contaminants from continuing into the upper chamber for ingress into lateral openings 86 in the downwardly extending projection 56. It is recognized that screen or mesh need not be of a regular pattern, but also includes interpenetrating wire or fiber networks which effectively impede liquids from penetrating therethrough.

Figures 7, 7A:
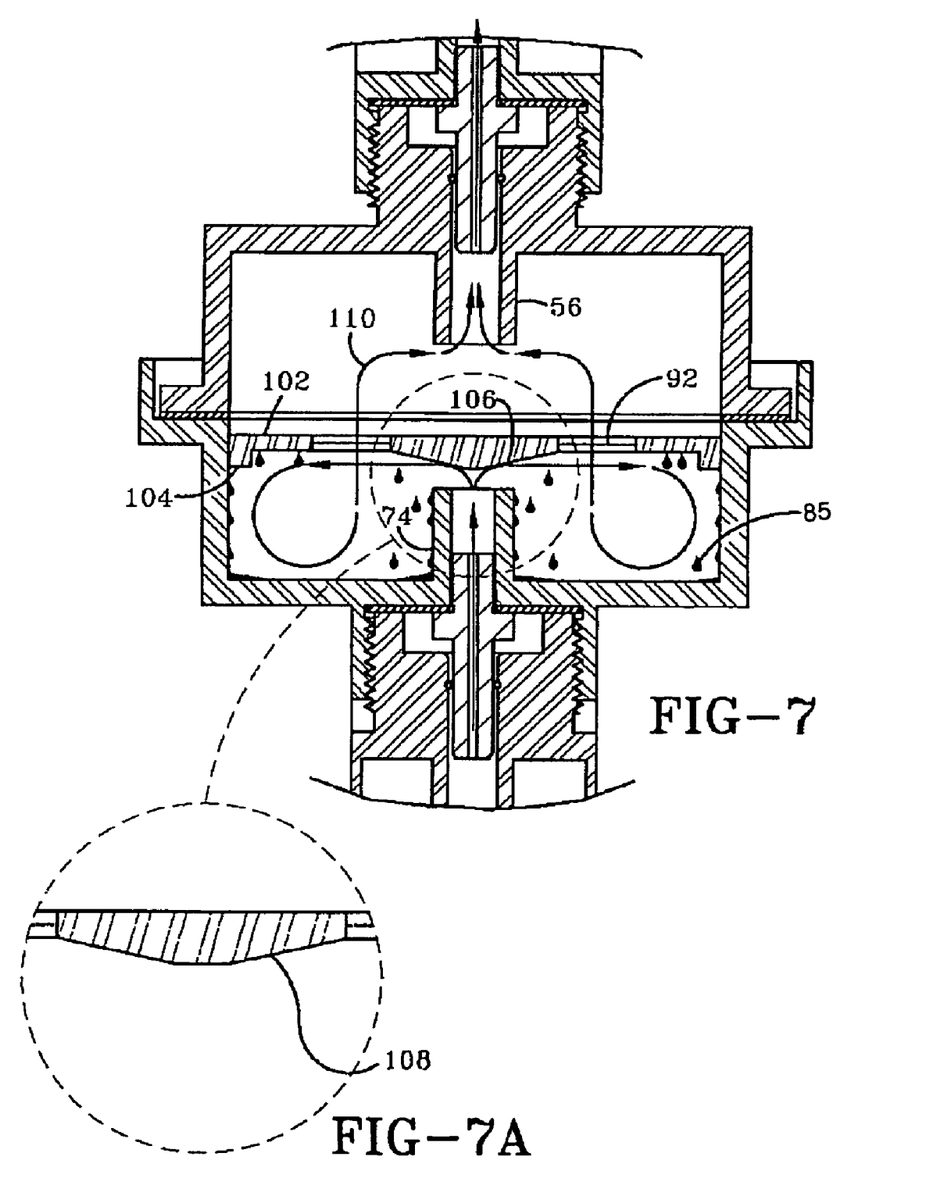
FIG. 7 is a side cross-sectional view of an alternative embodiment of the invention illustrating a conical impingement device.
FIG. 7A is an enlarged cross-sectional view of the conical impingement device of FIG. 7

In yet another alternative embodiment illustrated in FIG. 7, the separation device employs a conical channeling means 106 for diverting the contaminated fuel peripherally and laterally from an open channel of projection 74 to the side walls. In this embodiment, partition 102 is secured by a ledge 104 in the lower half of the partitioning device. Additionally, it is recognized that conical surface 106, could alternatively, be conical or frustoconical 108 in shape as illustrated in FIG. 7A.

It should be understood that the depictions of possible air flow pathways, e.g., 112 in FIG. 5; 98 in FIG. 6; and 110 in FIG. 7 are not meant to imply any specific mode or theory of operation, but rather to illustrate to the reader that the gaseous flow will originate at fuel source 20 and flow through rubber hose 12 and into separation device 14 in any number of patterns. The depiction of the arrows is merely meant to be as a guide to the reader to illustrate possible gaseous flow.

In general, separation device 14 is preferably metallic, e.g., aluminum or steel, preferably stainless steel, although there is no need to limit the construction to these materials. In various embodiments, portions of the device may be metallic e.g., impingement means, while other portions may be polymeric, e.g., outer housing. While still in other embodiments, the entire separation device may be of polymeric origin. The key to the selection of the polymer is its ability to withstand tank operating pressures without deformation.

When polymers are employed, a non-limiting exemplary list of plastics would include polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

More specifically, polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbomene; as well as mixtures of such copolymers and their mixtures with polymers mentioned above, for example polypropylene/ethylene-propylene copolymers, LDPE/EVA, LDPE/EEA, LLDPE/EVA and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, include acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane]terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

In the foregoing description, certain terms have been used for brevity, clearness and understanding; but no unnecessary limitations are to be implied there from beyond the requirements of the Prior Art, because such terms are used for descriptive purposes and are intended to be broadly construed. Moreover, the description and illustration of the invention is by way of example, and the scope of the invention is not limited to the exact details shown or described. This invention has been described in detail with reference to specific embodiments thereof, including the respective best modes for carrying out each embodiment. It shall be understood that these illustrations are by way of example and not by way of limitation.

What is claimed is:

1. A separation device which comprises:
   a top having an opening therein and an internal downwardly extending projection extending therefrom having a channel disposed therein and at least one ingress pathway into said channel, said channel connecting with said top opening;
   a bottom having an opening therein and an internal upwardly extending projection extending therefrom having a channel disposed therein and at least one egress pathway from said channel, said channel connecting with said bottom opening;
   an impingement surface between said projections;
   a sealing means between said top and said bottom;
   said impingement surface further comprises
   a downwardly-extending peripheral lip;
   at least two radially spaced upwardly extending arms from said surface;
   at least two radially spaced downwardly extending arms from said surface;
   each of said upwardly extending arms in sliding engagement with said downwardly extending projection from said top; and
   each of said downwardly extending arms in sliding engagement with said upwardly extending projection from said bottom.

2. The device of claim 1 wherein
   said at least two radially spaced upwardly extending arms is at least three radially spaced upwardly extending arms and
   said at least two radially spaced downwardly extending arms is at least three radially spaced downwardly extending arms.

3. The device of claim 2 wherein
   said at least three radially spaced upwardly extending arms is at least four radially spaced upwardly extending arms and
   said at least three radially spaced downwardly extending arms is at least four radially spaced downwardly extending arms.

4. The device of claim 1 wherein
   said impingement surface moves axially between said projections.

5. The device of claim 4 wherein
   said at least one egress pathway is formed by the combination of at least one peak and one valley at an upper tip of said projection.

6. The device of claim 5 wherein
   said at least one egress pathway is at least two egress pathways formed by at least two valleys at said upper tip of said projection.

7. The device of claim 6 wherein
   said at least one ingress pathway is formed by the combination of at least one peak and one valley at a lower tip of said projection.

8. The device of claim 7 wherein
   said at least one ingress pathway is at least two ingress pathways formed by at least two valleys at said lower tip of said projection.

9. A separation device which comprises:
   a top having an opening therein and an internal downwardly extending projection extending therefrom having a channel disposed therein and at least one ingress pathway into said channel, said channel connecting with said top opening;
   a bottom having an opening therein and an internal upwardly extending projection extending therefrom having a channel disposed therein and at least one egress pathway from said channel, said channel connecting with said bottom opening;
   an impingement surface between said projections;

a sealing means between said top and said bottom;
said impingement surface further comprises
a downwardly-extending peripheral lip; and
an apertured partition means between said top and said bottom.

10. The device of claim 9 wherein
said apertured partition means further comprises a mesh in said apertures.

11. A separation device which comprises:
a top having an opening therein and an internal downwardly extending projection extending therefrom having a channel disposed therein and at least one ingress pathway into said channel, said channel connecting with said top opening;
a bottom having an opening therein and an internal upwardly extending projection extending therefrom having a channel disposed therein and at least one egress pathway from said channel, said channel connecting with said bottom opening;
an impingement surface between said projections;
a sealing means between said top and said bottom;
surface further comprises
a downwardly-extending peripheral lip; and
a mesh partition means between said top and said bottom.

12. A separation device for removal of a contaminant from a fuel which comprises:
an essentially hollow cylindrical top having an opening therein and an internal downwardly extending projection extending therefrom having a channel disposed therein and at least one ingress pathway into said channel, said channel in communication with said top opening;
an essentially hollow cylindrical bottom having an opening therein and an internal upwardly extending projection extending therefrom having a channel disposed therein and at least one egress pathway from said channel, said channel in communication with said bottom opening;
an impingement surface in fluid communication with said fuel for condensing said contaminant after exiting from said egress pathway;
a sealing means between said top and said bottom; and
said impingement surface further comprises
a downwardly-extending peripheral lip.

13. The device of claim 12 wherein said impingement surface has
at least two radially spaced upwardly extending arms from said surface;
at least two radially spaced downwardly extending arms from said surface;
each of said upwardly extending arms in sliding engagement with said downwardly extending projection from said top; and
each of said downwardly extending arms in sliding engagement with said upwardly extending projection from said bottom.

14. The device of claim 13 wherein
said at least two radially spaced upwardly extending arms is at least three radially spaced upwardly extending arms and
said at least two radially spaced downwardly extending arms is at least three radially spaced downwardly extending arms.

15. The device of claim 14 wherein
said at least three radially spaced upwardly extending arms is at least four radially spaced upwardly extending arms and
said at least three radially spaced downwardly extending arms is at least four radially spaced downwardly extending arms.

16. The device of claim 13 wherein
said impingement surface moves axially between said projections.

17. The device of claim 16 wherein
said at least one egress pathway is formed by the combination of at least one peak and one valley at an upper tip of said projection.

18. The device of claim 17 wherein
said at least one egress pathway is at least two egress pathways formed by at least two valleys at said upper tip of said projection.

19. The device of claim 18 wherein
said at least one ingress pathway is formed by the combination of at least one peak and one valley at a lower tip of said projection.

20. The device of claim 19 wherein
said at least one ingress pathway is at least two ingress pathways formed by at least two valleys at said lower tip of said projection.

21. A separation device for removal of a contaminant from a fuel which comprises:
an essentially hollow cylindrical top having an opening therein and an internal downwardly extending projection extending therefrom having a channel disposed therein and at least one ingress pathway into said channel, said channel in communication with said top opening;
an essentially hollow cylindrical bottom having an opening therein and an internal upwardly extending projection extending therefrom having a channel disposed therein and at least one egress pathway from said channel, said channel in communication with said bottom opening;
an impingement surface in fluid communication with said fuel for condensing said contaminant after exiting from said egress pathway;
a sealing means between said top and said bottom; and
an apertured partition means between said top and said bottom.

22. The device of claim 21 wherein
said partition means further comprises a mesh in said apertures.

23. A separation device for removal of a contaminant from a fuel which comprises:
an essentially hollow cylindrical top having an opening therein and an internal downwardly extending projection extending therefrom having a channel disposed therein and at least one ingress pathway into said channel, said channel in communication with said top opening;
an essentially hollow cylindrical bottom having an opening therein and an internal upwardly extending projection extending therefrom having a channel disposed therein and at least one egress pathway from said channel, said channel in communication with said bottom opening;
an impingement surface in fluid communication with said fuel for condensing said contaminant after exiting from said egress pathway;
a sealing means between said top and said bottom; and
a mesh partition means between said top and said bottom.

24. A separation device for removal of impurities extracted from a flexible conduit from a fuel which comprises:
a housing having an inlet and an outlet;
a means for channeling said fuel from said inlet;

an impingement surface in fluid communication with said fuel after said channeling means for condensing said impurities;

a gravity separation means for collecting said impurities removed from said fuel;

a means for channeling said fuel into said outlet;

said means for channeling said fuel from said inlet is a radially deflecting means; and wherein said radially deflecting means is a capped upwardly extending projection from said inlet having at least one horizontal aperture in said projection.

25. A separation device for removal of impurities extracted from a flexible conduit from a fuel which comprises:

a housing having an inlet and an outlet;

a means for channeling said fuel from said inlet;

an impingement surface in fluid communication with said fuel after said channeling means for condensing said impurities;

a gravity separation means for collecting said impurities removed from said fuel;

a means for channeling said fuel into said outlet;

an apertured partition means in said housing; and said partition means further comprises a mesh in said apertures.

\* \* \* \* \*

UNITED STATES PATENT AND TRADEMARK OFFICE
CERTIFICATE OF CORRECTION

| | |
|---|---|
| PATENT NO. | : 7,431,748 B2 |
| APPLICATION NO. | : 10/907784 |
| DATED | : October 7, 2008 |
| INVENTOR(S) | : Vandrak et al. |

It is certified that error appears in the above-identified patent and that said Letters Patent is hereby corrected as shown below:

Col. 9, Claim 11, line 23, reads "surface further comprises"

Should read, "said impingement surface further comprises".

Signed and Sealed this

Thirtieth Day of December, 2008

JON W. DUDAS
*Director of the United States Patent and Trademark Office*